Patented Dec. 30, 1941

2,267,760

UNITED STATES PATENT OFFICE 2,267,760

DIAZO-AMINO PRINTING COMPOSITION

Jacob Bernard Shohan, West Orange, N. J., assignor to May Chemical Corporation, Newark, N. J., a corporation of New Jersey No Drawing. Application March 30, 1936, Serial No. 71,795. Renewed March 25, 1939

9 Claims. (Cl. 8—71)

This invention relates to triazene derivatives of the diazo-amino type, and their utilization, as well as methods of preparing such derivatives and compositions containing the same, and utilizing them for various purposes.

Diazo-amino compounds (1:2.3 triazenes) have been known in the prior art for a great many years. Their value for industrial application depends on the production of diazo-amino compounds which exhibit satisfactory stability in aqueous and alkaline solutions at normal temperatures. The prior art types of such diazoamino derivatives which were first available, did not possess water solubility, nor stability for many uses. In more recent years, methods of producing diazo-amino compounds have been developed with varying degrees of success; but those which have gone into commercial use, as in connection with printing pastes, have required the presence of a solubilizing group, such as carboxyl or the sulphonic acid groups, which gave alkali metal salts soluble in water, and stable in water and alkaline solutions.

Among the objects of the present invention is the production of diazo-amino compounds that are stable at normal temperatures, and in aqueous and alkaline solutions, without necessitating the presence of carboxyl or sulphonic acid groups, or equivalent water-solubilizing groups.

Other and further objects and advantages of the present invention will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, stable diazo-amino compounds are produced having the general formula $$R-N=N-N(H)-R_1$$

in which the hydrogen of the amino group is acidic, and in which $R_1$ is

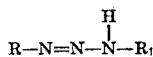

or its tautomeric form

and $x$ is a non-metallic element or group, such as O, S, NH, alkoxy, etc. Desirably those compounds are used in which $x$ is the divalent group, O, S, NH, both valences being directly joined to the carbon atom. Such stable diazo-amino compounds are desirably produced from a diazonium compound of an aromatic amine suitable for producing dyestuffs, and a compound $NH_2.R_1$, where $R_1$ has the designation indicated above.

The aromatic amines suitable for producing azo dyestuffs, the residue of which is represented by R in the formula given above, are selectable from a wide variety of compounds including derivatives of benzene, naphthalene, diphenyl, azobenzene, diphenylamine, anthraquinone, carbazole, and which derivatives besides containing one or two amino groups capable of being diazotized or tetrazotized may contain other substituent groups, such as alkyl, alkoxy, halogen, the nitro group, substituted amino groups, etc. Desirably such diazotized amine is selected from the group consisting of the di-substituted aromatic amines, the meta-halogen anilines, nitro-substituted aromatic amines, and alkoxy-substituted aromatic amines, as well as ortho-bromaniline.

As noted above $R_1$ in the formula given includes the grouping

or its tautomeric form, in which the additional valences may be substituted by desired groups. Preferably, the compound containing the group

includes electro-negative groups, such as CN, $NO_2$, OH, NO, etc. While carboxyl and sulphonic acid groups may be present, they are not essential, since the diazo-amino compounds including the acidic hydrogen, referred to above in the triazene molecule, are capable of forming waterstable salts, particularly of the alkali and alkaline earth metals, without requiring the presence of carboxyl or sulphonic acid groups, or their equivalents.

In producing the diazo-amino derivatives, the desired aromatic amine suitable for producing dyestuffs is diazotized in the usual way, as by means of sodium nitrite and hydrochloric acid, desirably at relatively low temperatures, and the diazonium salt added to the stated compound $NH_2.R_1$ as indicated above, the latter either being in suspension or solution, desirably in an alkaline medium. Caustic alkali, etc. may be utilized as the alkali. The reaction may be completed by heating, and the reaction product either salted out, or the medium evaporated to substantial dryness under reduced pressure to obtain the diazo-amino derivative.

The diazo-amino compounds produced in accordance with the present invention may desirably be utilized for various purposes, as in the preparation of dyes, for dyeing and printing, etc. Since they are stable derivatives, they may be readily shipped in solid form for use when and where desired. For the same reason they may be made into printing pastes with desirable coupling components, such as the arylides, etc., with the usual thickeners, gums and assistants, etc. Where necessary caustic or other alkalies may be used in making such printing pastes. They may be utilized for dyeing and printing textile fabrics and fibers including the cellulosic products, silk, wool, acetate, etc. For example, the cellulosic fabric, such as cotton cloth, may be impregnated by such printing paste, dried and steamed in an acid vapor, such as acetic acid. Or instead of steaming in an acid vapor, heat treatment in aqueous acid solutions, etc. may be employed. Under such conditions, the diazo-amino compound is thus decomposed and couples on the fiber with the coupling component to give fast shades. Or the fiber may first be impregnated with the coupling component, the diazo-amino compound printed thereon, and the fabric then steamed in an acid vapor for development of the color.

The coupling components employed may be widely variant in character, as is well understood in the art, and various types may be employed depending on the ultimate dye or color to be produced. Desirable coupling components include the anilide of 2.3 hydroxynaphthoic acid, diaceto-acetyl-o-tolidide, and the usual type of coupling components employed in the production of azo dyes. They include, for example, those commonly employed, such as the naphthols, the naphtholates, the arylides of hydroxynaphthoic acid, methyl phenyl pyrazolones, aceto-acetic acid arylides, arylides of hydroxycarbazole-o-carbonic acid, dihydroxyquinolines, etc.

Particularly illustrating the compounds of the type NH$_2$.R$_1$ referred to above as utilized in producing the diazo-amino derivatives from the diazotized aromatic amines suitable for producing azo dyestuffs, dicyandiamide having the formula NH$_2$.C(NH).NHCN is very desirably employed, and yields diazo-amino derivatives in which the hydrogen of the amino group in the diazo-amino nucleus is acidic, the resulting diazo-amino compound yielding stable derivatives having solubility in water or alkaline solutions yielding stable water-soluble salts of the alkali and alkaline earth metals, desirably employed for dyeing, printing, as in the form of printing pastes, etc. And it is particularly emphasized that such dicyandiamide derived diazo-amino compounds contain no water-solubilizing groups, such as carboxyl or sulphonic acid, and yet yield the water-soluble derivatives of great importance in the art.

As exemplary of the production of such diazo-amino compounds, the following specific example is given. 4.9 parts by weight dianisidine are dissolved in 100 parts of water with 12 parts of concentrated hydrochloric acid. The solution is tetrazotized at 5°–10° C. with 2.8 parts of sodium nitrite in 10 parts of water. The tetrazonium salt solution is then added to a suspension of 6 parts dicyandiamide in 150 parts of water containing about 50 parts of ice. 9 parts of 50% caustic soda are added, and the resulting solution heated at about 45° C. until all of the tetrazo compound disappears.

On salting out there is obtained a practically theoretical yield of a substance having the probable formula:

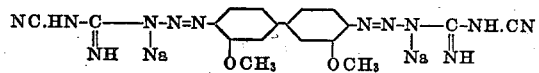

The crystals are desirably dried at a low temperature. The new compound is stable as a solid and in aqueous and alkaline solution. Dilute acids decompose it, best on heating, into the tetrazonium salt, which in the presence of a desired coupling component, such as the anilide of 2.3 hydroxynaphthoic acid, produces a blue, water-insoluble azo dyestuff. Such properties make the new compounds valuable materials for various utilities as further pointed out below.

As additional example illustrating the production of the diazo-amino compounds in accordance with the present invention, and their utilization, the following is given. 6.5 parts dichloraniline (2:5) in 15 parts concentrated hydrochloric acid and 40 parts water are diazotized in the usual manner with 2.8 parts sodium nitrite. The resulting solution is desirably filtered and added to a solution of 6 parts dicyandiamide in 250 parts water. A solution of 8 parts caustic soda is added, and the mixture warmed to 75° C. After the disappearance of the diazo compound, the mixture is filtered from any insoluble matter that may be produced and salted out with common salt. A satisfactory yield is obtained of a product having the formula

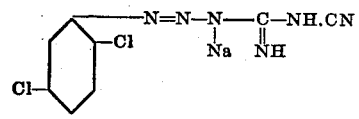

The new compound is soluble in water, and is stable in such solution. In the presence of acids or acid salts, the diazo-amino compound regenerates the diazo derivative of dichloraniline, which may then combine with suitable coupling compounds to form insoluble azo dyestuffs as illustrated above.

The stability of the diazo-amino compounds produced in accordance with the present invention enables the compounds as such to be stored or shipped, or in compositions admixed with the coupling components, or the cloth or fibers, etc. may be printed and the printed fabric or fiber stored until color development is desired.

Having thus set forth my invention, I claim:

1. A printing composition containing a diazo-amino compound obtained from the reaction of an aromatic amine suitable for the production of azo dyestuffs with dicyandiamide.

2. A printing composition containing a coupling component and a diazo-amino compound obtained from the reaction of an aromatic amine suitable for the production of azo dyestuffs with dicyandiamide.

3. A printing composition containing the compound

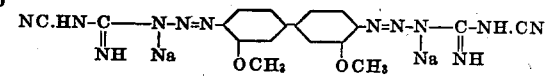

4. A printing composition containing the anilide of 2.3 hydroxynaphthoic acid and the diazoamino compound from dianisidine and dicyandiamide.

5. A printing composition containing diaceto acetyl-o-tolidide and the diazo-amino compound from 2.5 dichlor-aniline and dicyandiamide.

6. A printing composition containing the compound

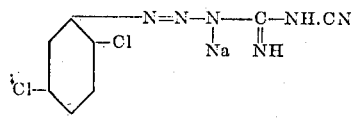

7. A printing composition containing the anilide of 2.3 hydroxynaphthoic acid and the diazo-amino compound from dichloraniline and dicyandiamide.

8. A printing composition containing a coupling component and a diazo-amino compound obtained from the reaction of a di-substituted aromatic amine suitable for the production of azo dyestuffs with dicyandiamide.

9. A printing composition containing a coupling component and a diazo-amino compound obtained from the reaction of an alkoxy-substituted aromatic amine suitable for the production of azo dyestuffs with dicyandiamide.

JACOB BERNARD SHOHAN.